United States Patent
Kuwabara et al.

(10) Patent No.: US 9,170,151 B2
(45) Date of Patent: Oct. 27, 2015

(54) PHOTODETECTOR, FOR USE IN A LASER MICROSCOPE, WITH OFFSET CORRECTION FOR UNIFORM BLACK LEVELS

(71) Applicant: OLYMPUS CORPORATION, Shibuya-ku, Tokyo (JP)

(72) Inventors: Yohei Kuwabara, Tokyo (JP); Akinori Araya, Kanagawa (JP); Kunihiko Sasaki, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 252 days.

(21) Appl. No.: 13/895,216

(22) Filed: May 15, 2013

(65) Prior Publication Data

US 2013/0306839 A1 Nov. 21, 2013

(30) Foreign Application Priority Data

May 18, 2012 (JP) .................................. 2012-114444

(51) Int. Cl.
*G01N 21/71* (2006.01)
*G02B 21/00* (2006.01)
*G02B 21/06* (2006.01)
*G01J 1/46* (2006.01)

(52) U.S. Cl.
CPC ................. *G01J 1/46* (2013.01); *G02B 21/008* (2013.01); *G02B 21/002* (2013.01)

(58) Field of Classification Search
CPC .................................................. G01N 21/718
USPC ............... 250/206.1, 214 R, 458.1; 356/318; 359/368, 385–390
See application file for complete search history.

(56) References Cited

U.S. PATENT DOCUMENTS

2006/0131484 A1* 6/2006 Peting ...................... 250/214 R

FOREIGN PATENT DOCUMENTS

JP 2005-234500 A 9/2005
JP 2012-002732 A 1/2012

OTHER PUBLICATIONS

English machine translation of JP2012-002732.*
Extended European Search Report (EESR) dated Aug. 6, 2013 (in English) issued in counterpart European Application No. 13002590.1.

* cited by examiner

*Primary Examiner* — Renee D Chavez
(74) *Attorney, Agent, or Firm* — Holtz, Holtz, Goodman & Chick PC

(57) ABSTRACT

Provided is a photodetector including a light receiving portion that accumulates and outputs the amount of received observation light as electric charges; an offset portion that adds an offset signal to an output signal from the light receiving portion; an AD conversion portion that AD-converts the sum of the output signal and the offset signal obtained by the offset portion; a control unit that controls the AD conversion portion such that it A-D converts said sum when the light receiving portion is charged and discharged; and an offset correcting portion that corrects the offset signal by adjusting the value of the offset signal contained in the black level value such that the black level value obtained by the AD conversion portion from said sum when the capacitor is discharged becomes equal to a predetermined target value.

2 Claims, 4 Drawing Sheets

PHOTODETECTOR, FOR USE IN A LASER MICROSCOPE, WITH OFFSET CORRECTION FOR UNIFORM BLACK LEVELS

CROSS-REFERENCE TO RELATED APPLICATIONS

This application is based on Japanese Patent Application No. 2012-114444, the content of which is incorporated herein by reference.

TECHNICAL FIELD

The present invention relates to a photodetector.

BACKGROUND ART

A known laser scanning microscope in the related art uses an integrator circuit to amplify an electrical signal to obtain a signal (for example, see PTL 1). By using the integrator circuit, an image with a high SN ratio can be obtained even when light coming from a specimen is faint. Furthermore, by adjusting the offset of a black level signal, the contrast can be adjusted such that the light coming from the specimen is displayed with the optimum brightness in an image.

CITATION LIST

Patent Literature

{PTL 1} Japanese Unexamined Patent Application, Publication No. 2005-234500

SUMMARY OF INVENTION

Technical Problem

Typically, in an electric circuit, offset drift occurs due to ambient temperature changes. In PTL 1, an AD converter converts a signal when a specimen is not irradiated with light and a signal when the specimen is irradiated with light, which are obtained from a light-receiving element, into digital values to obtain, from the difference between these two digital values, a digital value corresponding to the magnitude of a light signal, and this digital value is used as the brightness of the image. In this configuration, when the black level signal is varied due to offset drift, the dynamic range of the AD converter allocated for the conversion of light signals is changed, so, even if light signals having the same magnitude are input to the AD converter, different digital values are output from the AD converter.

When the black level signal increases, the dynamic range allocated for the conversion of light signals decreases. Hence, when a relatively large light signal is input, the output value of the AD converter is saturated, failing to obtain an accurate digital value. Furthermore, when observing a specimen over time with a laser scanning microscope in that, even if the offset value of the black level signal is initially set such that an image has the optimum contrast, it is impossible to continuously acquire the image with the optimum contrast.

The present invention has been made in view of the above-described circumstances, and the present invention provides a photodetector that provides a uniform black level and enables a stable digital value of a light signal to be obtained with an AD converter.

Solution to Problem

The present invention provides a photodetector provided in a laser scanning microscope that scans a laser beam across a specimen to detect observation light generated in the specimen and that obtains an image of the specimen in which the intensity of the observation light is associated with the scanning position of the laser beam. The photodetector includes a light receiving portion including a photoelectric conversion element that receives the observation light and outputs signal charges in an amount corresponding to the amount of received observation light, an integrator circuit that accumulates the signal charges output from the photoelectric conversion element in a capacitor to integrate the signal charges, and a switching portion that switches between charging and discharging of the capacitor with the signal charges; an offset portion that adds an offset signal to an output signal from the light receiving portion; an AD conversion portion that converts the sum of the output signal and the offset signal obtained by the offset portion into a digital value; a control unit that controls the operation timing of the AD conversion portion such that it converts, into digital values, the sum of the offset signal and the output signal from the light receiving portion when the capacitor is charged and the sum of the offset signal and the output signal from the light receiving portion when the capacitor is discharged before being charged; and an offset correcting portion that corrects the offset signal to be used in the offset portion according to a black level value obtained by the AD conversion portion from the sum of the offset signal and the output signal when the capacitor is discharged. The offset correcting portion outputs, to the offset portion, the offset signal obtained by adjusting the value of the offset signal contained in the black level value such that the black level value becomes equal to a predetermined target value.

DESCRIPTION OF EMBODIMENTS

A photodetector 1 according to an embodiment of the present invention will be described below with reference to the drawings.

Figure 1:
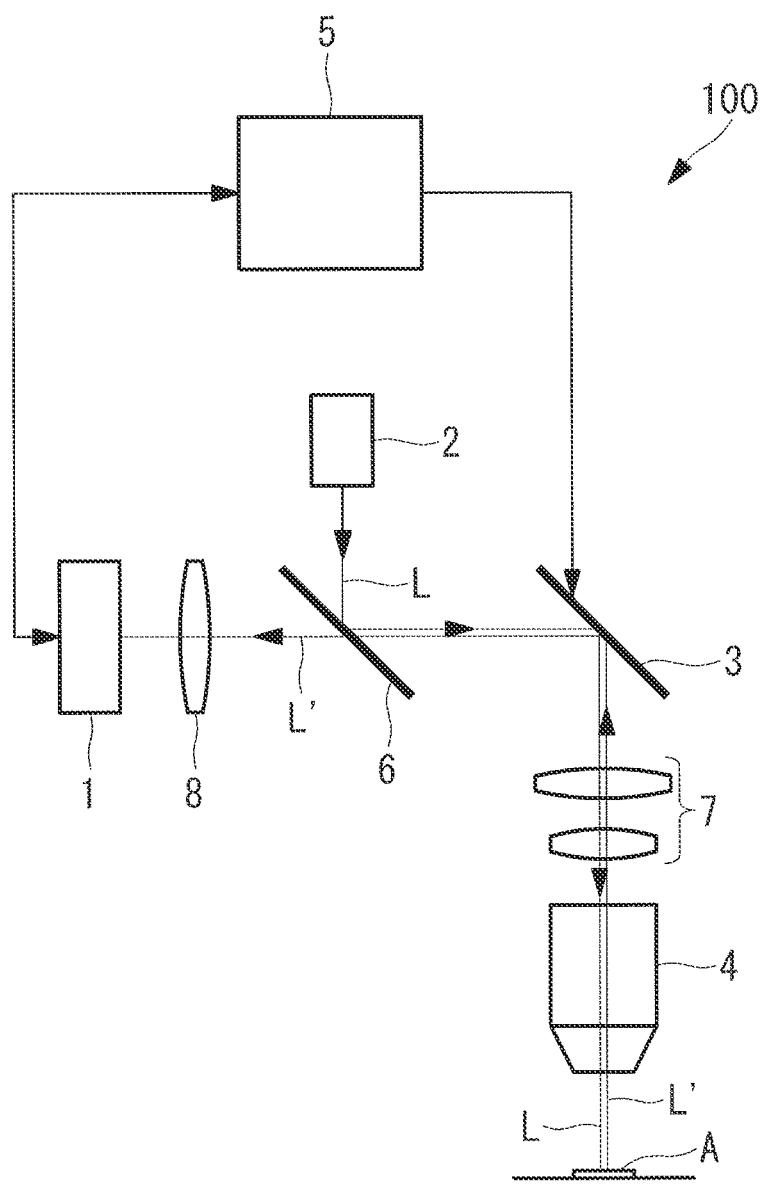
FIG. 1 is a diagram illustrating the overall configuration of a laser scanning microscope according to an embodiment of the present invention.

As illustrated in FIG. 1, a photodetector 1 according to this embodiment is installed and used in a laser scanning microscope (LSM) 100. First, the LSM 100 according to this embodiment will be described.

As illustrated in FIG. 1, the LSM 100 includes a laser light source 2, a scanner 3 that raster-scans a laser beam L output from the laser light source 2, an objective lens 4 that radiates the laser beam L scanned by the scanner 3 onto a specimen A and collects observation light L' coming from the specimen A, the photodetector 1, which detects the observation light L' collected by the objective lens 4 and outputs the intensity of the observation light L' as a digital value, and a main control unit 5 that controls the operation of the scanner 3 and the photodetector 1 and generates an image of the specimen A using the digital value output from the photodetector 1.

Reference numeral 6 in FIG. 1 denotes a dichroic mirror that reflects the laser beam L emitted from the laser light source 2 while allowing the observation light L' collected by the objective lens 4 to pass therethrough. Reference numeral 7 denotes a relay lens unit that relays the laser beam L from the scanner 3 to the objective lens 4. Reference numeral 8 denotes a focusing lens that focuses the observation light L' passing through the dichroic mirror 6 at the photodetector 1.

The laser beam L output from the laser light source 2 is reflected by the dichroic mirror 6 and the scanner 3 and is radiated onto the specimen A through the objective lens 4. The specimen A irradiated with the laser beam L generates reflected light of the laser beam L and fluorescence which is excited by the laser beam L, serving as the observation light L'. This observation light L' is collected by the objective lens 4, is reflected by the scanner 3, passes through the dichroic mirror 6, and is input to a light receiving portion 9 (described below) provided in the photodetector 1.

The main control unit 5 generates a synchronizing signal synchronized with the scanning period of the laser beam L in the scanner 3 and transmits the synchronizing signal to a control unit 13 provided in the photodetector 1. The photodetector 1 detects the observation light L' on the basis of the timing of the synchronizing signal from the main control unit 5, converts the intensity of the detected observation light L' into a digital value, and outputs the digital value to the main control unit 5. The main control unit 5 associates the digital value indicating the intensity of the observation light L', received from the photodetector 1, with the position of the laser beam L scanned by the scanner 3, thereby generating an image of the specimen A.

Next, the photodetector 1 will be described in detail.

Figure 2:
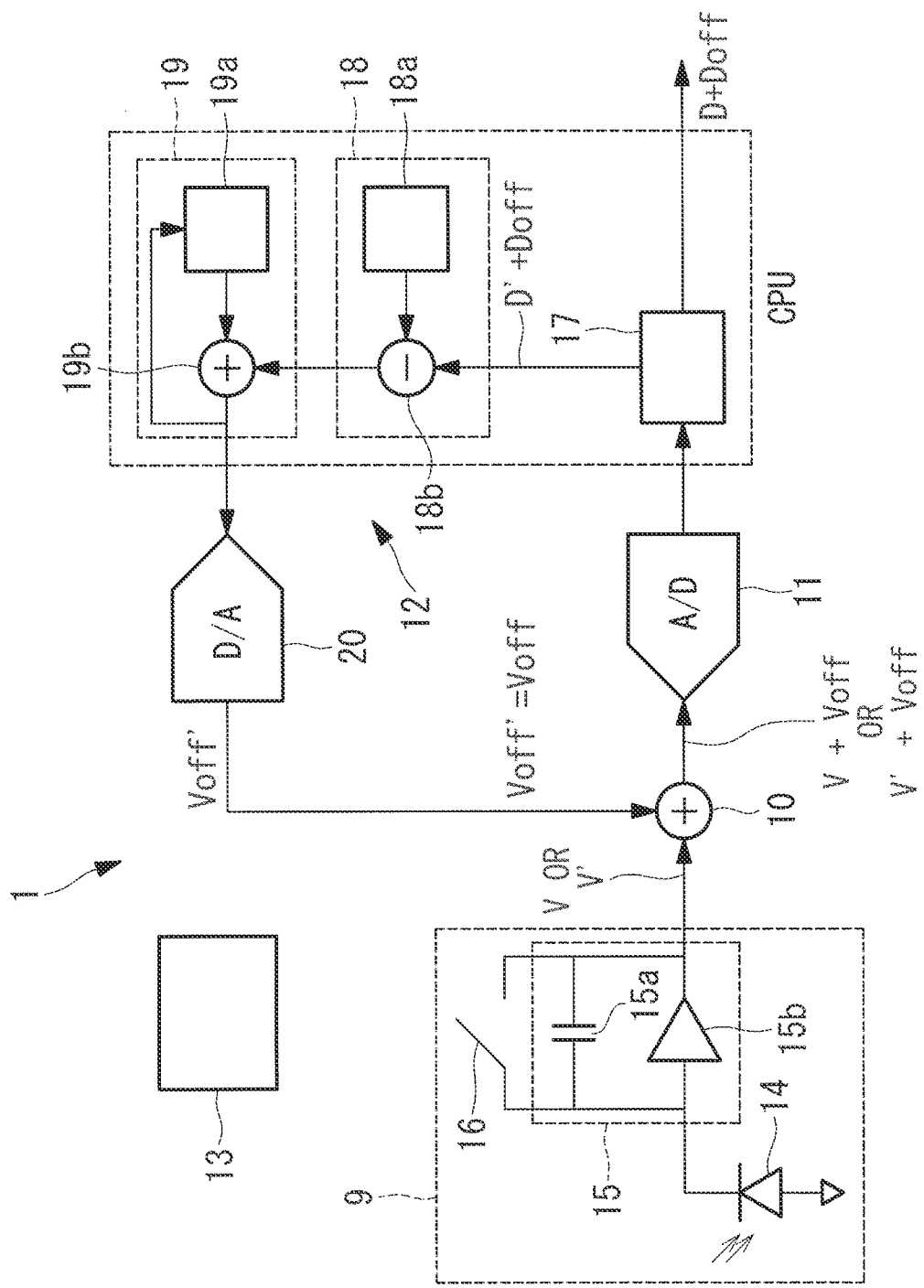
FIG. 2 is a diagram illustrating the overall configuration of a photodetector according to an embodiment of the present invention.

As illustrated in FIG. 2, the photodetector 1 according to this embodiment includes the light receiving portion 9 that receives the observation light L' collected by the objective lens 4 and outputs a light signal corresponding to the amount of light received, an offset portion 10 that adds an offset signal to the light signal output from the light receiving portion 9, an AD converter (AD conversion portion) 11 that converts the output signal from the offset portion 10 into a digital value, an offset correcting portion 12 that corrects the offset signal added by the offset portion 10, and the control unit 13 that controls the operation timing of the light receiving portion 9 and the AD converter 11.

The light receiving portion 9 includes a photoelectric conversion element 14 that detects the observation light L' and outputs signal charges corresponding to the intensity of the observation light L', an integrator circuit 15 that accumulates the signal charges output from the photoelectric conversion element 14, and a switch (switching portion) 16 connected in parallel with a capacitor 15a of the integrator circuit 15.

The integrator circuit 15 includes an operational amplifier 15b to which the signal charges from the photoelectric conversion element 14 are input. The capacitor 15a is connected between the input terminal and the output terminal of the operational amplifier 15b. When the switch 16 is open, the signal charges sent from the photoelectric conversion element 14 are accumulated in the capacitor 15a, and a light signal Vs corresponding to the accumulated amount is output from the integrator circuit 15. When the switch 16 is closed, the signal charges accumulated in the capacitor 15a are discharged, resetting the magnitude of the signal output from the integrator circuit 15.

Herein, an output signal V from the light receiving portion 9 when the capacitor 15a is charged is a signal in which a light signal Vs corresponding to the amount of received observation light L' is superposed on an output signal V' from the light receiving portion 9 when the capacitor 15a is discharged.

The control unit 13 controls the operation timing of the switch 16 on the basis of the synchronizing signal transmitted from the main control unit 5.

The offset portion 10 adds an offset signal Voff received from the offset correcting portion 12 (described below) to the output signal V or V' from the light receiving portion 9 when the capacitor is charged or discharged and outputs the resulting signal to the AD converter 11.

The AD converter 11 converts the sum of the output signal V' from the light receiving portion 9 when the capacitor is discharged and the offset signal Voff of the offset portion 10, i.e., a signal corresponding to the black level (hereinbelow, "black level voltage"), into a digital value and outputs the resulting black level value D'+Doff to a signal selecting portion 17 (described below) provided in the offset correcting portion 12. Furthermore, the AD converter 11 converts the sum of the output signal V from the light receiving portion 9 when the capacitor is charged and the offset signal Voff of the offset portion 10 into a digital value and outputs the resulting signal value D+Doff to the signal selecting portion 17. The control unit 13 controls the signal sampling timing of the AD converter 11 on the basis of the aforementioned synchronizing signal transmitted from the main control unit 5.

The offset correcting portion 12 includes the signal selecting portion 17, which directs, of the digital values received from the AD converter 11, the black level value D'+Doff to a difference calculating portion 18 (described below) and the signal value D+Doff to the main control unit 5; the difference calculating portion 18, which calculates the difference between the black level value D'+Doff received from the signal selecting portion 17 and a predetermined target value; a correction-value calculating portion 19 that calculates a digital value of a corrected offset signal (offset value), using the difference calculated by the difference calculating portion 18; and a DA converter 20 that converts the corrected offset value calculated by the correction-value calculating portion 19 into an analog signal.

The difference calculating portion 18 includes a target-value storage portion 18a that stores a predetermined target value and a subtraction portion 18b that subtracts the black level value D'+Doff from the predetermined target value stored in the target-value storage portion 18a. The predetermined target value stored in the target-value storage portion 18a is the optimum offset used to offset the light signal Vs and is set in the target-value storage portion 18a, for example, by a user using input means (not shown).

The correction-value calculating portion 19 includes an offset-value storage portion 19a that stores the offset value and an addition portion 19b that adds the difference calculated by the subtraction portion 18b to the offset value stored in the offset-value storage portion 19a.

The offset-value storage portion 19a stores an initial offset value that is the same as the predetermined target value stored in the target-value storage portion 18a, for example. The addition portion 19b adds the difference received from the subtraction portion 18b to the offset value stored in the offset-value storage portion 19a to calculate the corrected offset value. Then, the addition portion 19b outputs the corrected offset value to the DA converter 20 and the offset-value storage portion 19a.

Upon receipt of the corrected offset value from the addition portion 19b, the offset-value storage portion 19a replaces the stored offset value with the newly received corrected offset value, thereby updating the stored offset value.

The corrected offset value calculated by the correction-value calculating portion 19 is converted into an analog signal Voff' by the DA converter 20 and is sent to the offset portion 10. The offset portion 10 uses the signal Voff' newly received from the DA converter 20 as the offset signal Voff.

In this manner, each time the AD converter 11 obtains the black level voltage when the capacitor 15*a* is discharged and the offset correcting portion 12 corrects the offset signal Voff of the offset portion 10 that has been added to the output signal V' from the light receiving portion 9 when the capacitor is discharged, the offset signal Voff that the offset portion 10 adds to the output signal V from the light receiving portion 9 when the capacitor 15*a* is charged is updated.

Note that the above-described digital value processing performed by the signal selecting portion 17, the difference calculating portion 18, and the correction-value calculating portion 19 is executed by, for example, a central processing unit (CPU) provided in the photodetector 1.

Next, the operation of the thus-configured photodetector 1 will be described.

Figure 3:
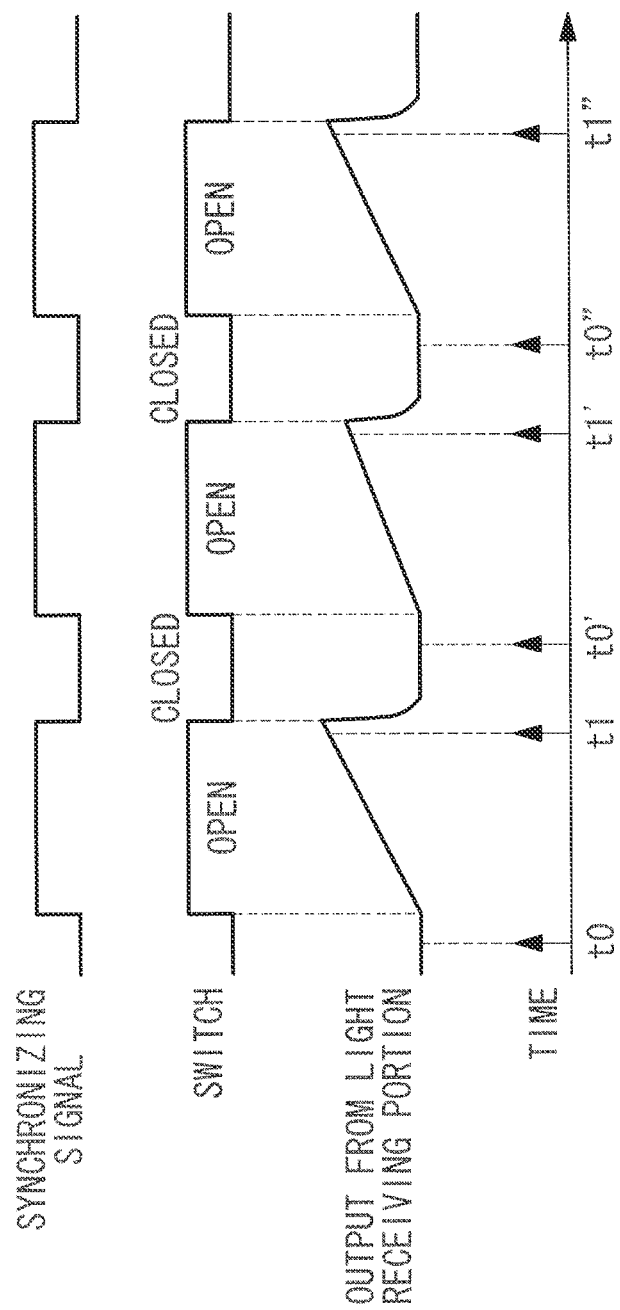
FIG. 3 is a timing chart for explaining the operation of the photodetector in FIG. 2.

As illustrated in FIG. 3, the photodetector 1 sequentially converts the output signal V' from the light receiving portion 9 when the capacitor 15*a* is discharged and the output signal V from the light receiving portion 9 when the capacitor 15*a* is charged into digital values to generate and output a digital value corresponding to one pixel in an image generated by the main control unit 5. In FIG. 3, arrows on the time axis indicate the timings at which the AD converter 11 converts the output signal from the light receiving portion 9 into a digital value.

More specifically, the control unit 13 opens or closes the switch 16 in synchronization with the synchronizing signal transmitted from the main control unit 5. When the switch 16 is closed, the output signal from the light receiving portion 9 is such that signal charges are not accumulated. When the switch 16 is opened, and the capacitor 15*a* starts to be charged with signal charges, the output signal from the light receiving portion 9 increases in proportion to the amount of observation light L' received by the photoelectric conversion element 14. Then, when the switch 16 is closed, the signal charges accumulated in the capacitor 15*a* start to be discharged, decreasing the magnitude of the output signal from the light receiving portion 9 to substantially the same level as that before the capacitor 15*a* is charged.

Herein, both when the capacitor is discharged and charged, the control unit 13 controls the operation timing of the AD converter 11 such that the AD converter 11 samples and converts, into a digital value, a signal in which the offset signal Voff of the offset portion 10 is added to the output signal V or V' from the light receiving portion 9. The sampling timing of the AD converter 11 when the capacitor is discharged and charged is set to when a sufficient time has elapsed since the switch 16 is closed or opened. That is, the AD converter 11 samples the black level voltage, in which the offset signal Voff of the offset portion 10 is superposed on the output signal V' from the light receiving portion 9 when the capacitor is discharged, when the capacitor 15*a* is sufficiently discharged, and the output signal from the light receiving portion 9 is sufficiently stable (t0, t0', t0"). Furthermore, the AD converter 11 samples the sum of the above-mentioned black level voltage V'+Voff and the light signal Vs corresponding to the amount of signal charge integrated by the integrator circuit 15, i.e., V=V'+Voff+Vs, when the photoelectric conversion element 14 has received a sufficient amount of light (t1, t1', t1").

The black level value D'+Doff obtained by the AD converter 11 is sent to the difference calculating portion 18, where the difference between the black level value and the target value is calculated. The resulting difference is used to correct the black level voltage in the offset correcting portion 12. More specifically, the addition portion 19*b* adds the difference received from the difference calculating portion 18 to the offset value currently stored in the offset-value storage portion 19*a*. Thus, when at least one of the output signal V' from the light receiving portion 9 when the capacitor is discharged and the offset signal Voff of the offset portion 10 is varied and, consequently, the black level value D'+Doff is changed, an offset value corrected so as to cancel the change in the black level value can be obtained.

The corrected offset value is converted into an analog signal by the DA converter 20, and the resulting offset signal Voff'=Voff is added to the output signal V from the light receiving portion 9 when the capacitor is charged by the offset portion 10. As has been described above, because this offset signal Voff has such a magnitude that it makes the magnitude of the black level voltage V'+Voff equal to the target value, the light signal Vs is offset by the offset portion 10 by an amount corresponding to the target value with respect to 0 V. The corrected offset value is stored in the offset-value storage portion 19*a* so as to be used to correct the next black level voltage when the capacitor is discharged.

As has been described above, in this embodiment, the black level voltage V'+Voff is measured when the capacitor is discharged, and when the measured black level voltage V'+Voff does not match the predetermined target value, the magnitude of the offset signal Voff of the offset portion 10 is corrected such that the black level voltage becomes equal to the predetermined target value. The corrected offset signal Voff' is added to the output signal V from the light receiving portion 9 when the capacitor is charged by the offset portion 10. As a result, even if the output signal V' from the light receiving portion 9 drifts due to ambient temperature changes, the light signal Vs from the light receiving portion 9 is input to the AD converter 11 with the level thereof offset by a certain signal level. Thus, it is possible to make the black levels of images and pixels in each image generated by the control unit 5 uniform.

Furthermore, for example, in long-term time-lapse observation using the LSM 100, because the offset value of the light signal Vs to be input to the AD converter 11 when the capacitor is charged is constant, the dynamic range in the AD converter 11 used to convert the light signal Vs into a digital value is also constant. Accordingly, when a black level voltage that causes the observation light L' to be displayed with the optimum brightness in an image, i.e., the target value, is set at the beginning of the time-lapse observation, the image can be continuously acquired with the optimum contrast conditions.

Figure 4:
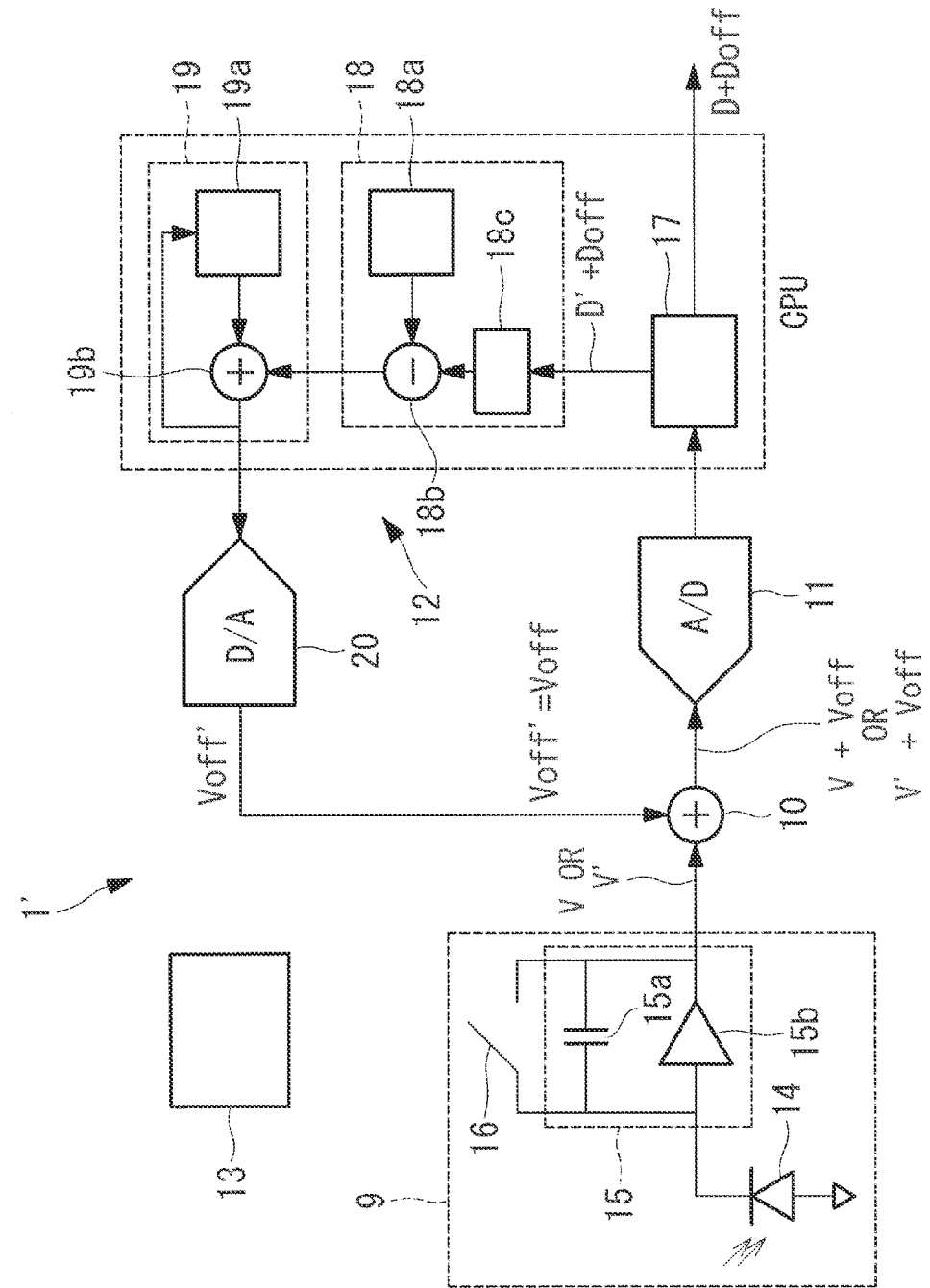
FIG. 4 is a diagram illustrating the overall configuration of a modification of the photodetector in FIG. 2.

Although the offset signal is corrected for each pixel in this embodiment, instead of this, the offset signal may be corrected for each row or frame in an image. More specifically, as illustrated in FIG. 4, a photodetector 1' may include an average value calculating portion 18*c* that calculates the average black level value of pixels in one row or one frame.

In such a case, the difference calculating portion 18 calculates the difference by subtracting the average value calculated by the average value calculating portion 18*c* from the target value. Each time the laser beam L is scanned one row or one frame, the offset correcting portion 12 receives the average black level value from the difference calculating portion 18, corrects the offset signal, outputs the corrected new offset signal to the offset portion 10, and stores the value of the offset signal in the offset-value storage portion 19*a*.

By doing so, variations of the offset signal due to local noise can be prevented.

The following inventions are derived from the embodiment and the modifications thereof described above.

The present invention provides a photodetector provided in a laser scanning microscope that scans a laser beam across a specimen to detect observation light generated in the specimen and that obtains an image of the specimen in which the intensity of the observation light is associated with the scanning position of the laser beam. The photodetector includes a light receiving portion including a photoelectric conversion element that receives the observation light and outputs signal charges in an amount corresponding to the amount of received observation light, an integrator circuit that accumulates the signal charges output from the photoelectric conversion element in a capacitor to integrate the signal charges, and a switching portion that switches between charging and discharging of the capacitor with the signal charges; an offset portion that adds an offset signal to an output signal from the light receiving portion; an AD conversion portion that converts the sum of the output signal and the offset signal obtained by the offset portion into a digital value; a control unit that controls the operation timing of the AD conversion portion such that it converts, into digital values, the sum of the offset signal and the output signal from the light receiving portion when the capacitor is charged and the sum of the offset signal and the output signal from the light receiving portion when the capacitor is discharged before being charged; and an offset correcting portion that corrects the offset signal to be used in the offset portion according to a black level value obtained by the AD conversion portion from the sum of the offset signal and the output signal when the capacitor is discharged. The offset correcting portion outputs, to the offset portion, the offset signal obtained by adjusting the value of the offset signal contained in the black level value such that the black level value becomes equal to a predetermined target value.

In the present invention, the observation light coming from the specimen and received by the photoelectric conversion element of the light receiving portion is converted into signal charges and charges the capacitor in the integrator circuit to be integrated for a certain period of time. Then, the integrated value is output from the light receiving portion, is offset by the offset portion, and is converted into a digital value by the AD conversion portion. The resulting digital value corresponds to the intensity of the observation light. Thus, the laser scanning microscope can receive the digital value from the photodetector and can generate an image in which a pixel has a brightness that is equal to the digital value.

In this case, before the digital value corresponding to the intensity of the observation light is obtained, the timing of AD conversion of the output signal from the light receiving portion is controlled by the control unit so that the AD conversion portion converts a signal obtained by adding the offset signal used by the offset portion to the output signal from the light receiving portion when the capacitor is discharged, i.e., the output signal from the light receiving portion when the signal charges are not accumulated (black level signal). The digital value obtained by the AD conversion portion, i.e., the black level value corresponding to the black level of the image, is compared with the predetermined target value by the offset correcting portion. If, as a result of the comparison, the black level value does not match the target value, the offset signal added, by the offset portion, to the output signal from the light receiving portion when the capacitor is discharged is corrected such that the black level value becomes equal to the target value. Then, the corrected offset signal is added, by the offset portion, to the output signal from the light receiving portion when the capacitor is charged.

More specifically, when the black level is varied due to variations of the output signal from the light receiving portion when the capacitor is discharged and the offset signal used in the offset portion, the offset signal used in the offset portion corrected so as to cancel the variations is added to the output signal from the light receiving portion when the capacitor is charged. Then, of the signal from the light receiving portion when the capacitor is discharged, contained in the output signal from the light receiving portion when the capacitor is charged, and the light signal generated from the observation light, the light signal is input to the AD conversion portion with the level thereof always offset by a certain signal level. Thus, it is possible to achieve a uniform black level and to enable a stable digital value of a light signal to be obtained with the AD conversion portion.

In the above-described invention, the offset correcting portion may use an average value of a plurality of black level values that are sequential in the time-axis direction to correct the offset signal.

In this case, the offset correcting portion calculates the average black level value of a plurality of pixels corresponding to, for example, one row or one frame and corrects the offset signal using the average value. The corrected offset signal is added to a subsequently obtained output signal from the light receiving portion when the capacitor is charged, corresponding to one row or one frame of pixels. By doing so, variations in the offset signal due to local noise can be prevented.

REFERENCE SIGNS List 1, 1': photodetector
2: laser light source
3: scanner
4: objective lens
5: main control unit
6: dichroic mirror
7: relay lens unit
8: focusing lens
9: light receiving portion
10: offset portion
11: AD converter
12: offset correcting portion
13: control unit
14: photoelectric conversion element
15: integrator circuit
15a: capacitor
15b: operational amplifier
16: switch (switching portion)
17: signal selecting portion
18: difference calculating portion
18a: target-value storage portion
18b: subtraction portion
18c: average value calculating portion
19: correction-value calculating portion
19a: offset-value storage portion
19b: addition portion
20: DA converter
100: laser scanning microscope
A: specimen
L: laser beam
L': observation light
Voff, Voff': offset signal
V: output signal from the light receiving portion when the capacitor is charged
V': output signal from the light receiving portion when the capacitor is discharged
Vs: light signal

The invention claimed is:

1. A photodetector provided in a laser scanning microscope that scans a laser beam across a specimen to detect observation light generated in the specimen and that obtains an image of the specimen in which an intensity of the observation light is associated with a scanning position of the laser beam, the photodetector comprising:

a light receiving portion including a photoelectric conversion element that receives the observation light and outputs signal charges in an amount corresponding to an amount of received observation light, an integrator circuit that accumulates the signal charges output from the photoelectric conversion element in a capacitor to integrate the signal charges, and a switching portion that switches between charging and discharging of the capacitor with the signal charges;

an offset portion that adds an offset signal to an output signal from the light receiving portion;

an AD conversion portion that converts a sum of the output signal and the offset signal obtained by the offset portion into a digital value;

a control unit that controls an operation timing of the AD conversion portion to make the AD conversion portion convert, into digital values, the sum of the offset signal and the output signal from the light receiving portion when the capacitor is charged and the sum of the offset signal and the output signal from the light receiving portion when the capacitor is discharged before being charged; and an offset correcting portion that corrects the offset signal to be used in the offset portion, wherein the offset correcting portion comprises a signal selecting portion, a difference calculating portion, a correction-value calculating portion, and a DA converter, wherein the difference calculating portion calculates a difference between a black level value and a predetermined target value, the black level value being obtained by the AD conversion portion from the sum of the offset signal and the output signal when the capacitor is discharged and being directed by the signal selecting portion to the difference calculating portion, wherein the correction value calculating portion calculates a digital value of a corrected offset signal using the difference calculated by the difference calculating portion, wherein the digital value is calculated to adjust a value of the offset signal contained in the black level value such that the black level value becomes equal to the predetermined target value, and wherein the DA converter converts the calculated digital value of the corrected offset signal into an analog signal for use in the offset portion.

2. The photodetector according to claim 1, wherein the offset correcting portion uses an average value of a plurality of black level values that are sequential in a time-axis direction to correct the offset signal.

* * * * *